United States Patent
McClurg

(10) Patent No.: US 7,119,890 B2
(45) Date of Patent: **\*Oct. 10, 2006**

(54) SYSTEM AND METHOD FOR ILLUMINATING A PLATEN IN A LIVE SCANNER AND PRODUCING HIGH-CONTRAST PRINT IMAGES

(75) Inventor: George W. McClurg, Jensen Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/246,525

(22) Filed: Oct. 11, 2005

(65) Prior Publication Data
US 2006/0028635 A1 Feb. 9, 2006

Related U.S. Application Data

(63) Continuation of application No. 10/462,592, filed on Jun. 17, 2003, now Pat. No. 6,954,261.

(51) Int. Cl.
*G06K 9/74* (2006.01)
(52) U.S. Cl. .................. 356/71; 356/445
(58) Field of Classification Search ............ 356/71, 356/446, 445; 382/115, 124, 125, 127
See application file for complete search history.

(56) References Cited

U.S. PATENT DOCUMENTS

| | | | |
|---|---|---|---|
| 5,623,553 A | 4/1997 | Sekiya | |
| 5,963,657 A | 10/1999 | Bowker et al. | |
| 5,986,746 A | 11/1999 | Metz et al. | |
| 6,127,674 A * | 10/2000 | Shinzaki et al. | 250/227.28 |
| 6,154,285 A * | 11/2000 | Teng et al. | 356/445 |
| 6,324,020 B1 | 11/2001 | Teng et al. | |
| 6,381,347 B1 * | 4/2002 | Teng et al. | 382/127 |
| 6,954,261 B1 | 10/2005 | McClurg | |

FOREIGN PATENT DOCUMENTS

WO WO 2004/114078 A2 12/2004

OTHER PUBLICATIONS

Copy of International Preliminary Report on Patentability including Written Opinion for PCT/US2004/019239; 5 pages.
Copy of International Search Report for International Application No. PCT/US2004/019239; 7 pages.
Appendix F IAFIS Image Quality Specifications; Federal Bureau of Investigation—CJIS Electronic Fingerprint Transmission Specification; 17 pages.

* cited by examiner

*Primary Examiner*—Gregory J. Toatley, Jr.
*Assistant Examiner*—Roy M. Punnoose
(74) *Attorney, Agent, or Firm*—Sterne, Kessler, Goldstein & Fox P.L.L.C.

(57) ABSTRACT

Light from an illumination source is injected into a prism of a print scanner through an illumination injection surface that is not directly imaged by an optical system and an image sensor of the print scanner. This light travels across the prism and hits a highly reflective surface of the prism. When this light hits the highly reflective surface, it is scattered and becomes diffused. Some of this diffused light remains in total internal reflection (TIR) within the prism and is reflected off the inside of the platen surface of the prism. The diffused light reflected off the inside of the platen surface is imaged by the optical system and the image sensor.

15 Claims, 6 Drawing Sheets

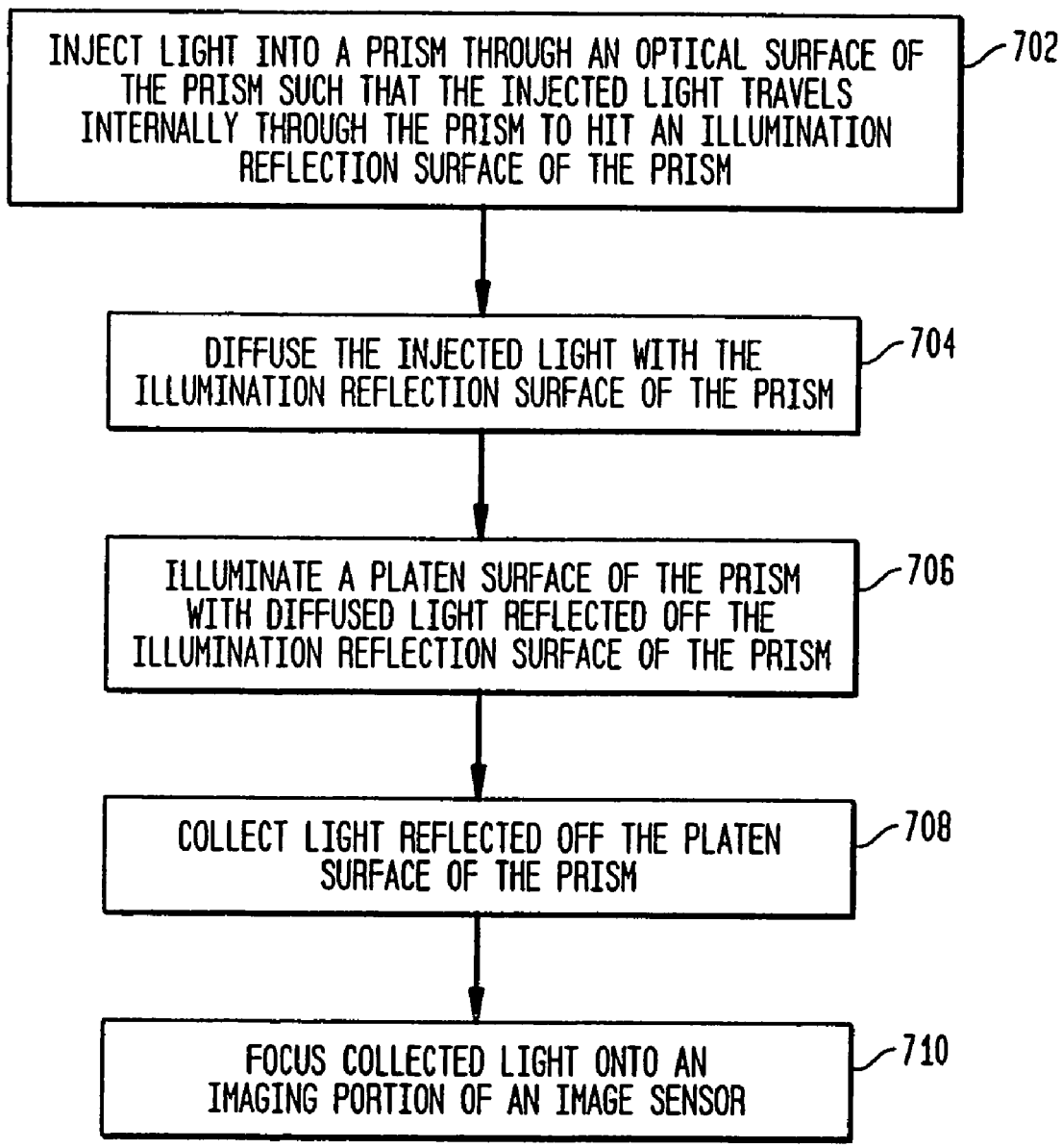

SYSTEM AND METHOD FOR ILLUMINATING A PLATEN IN A LIVE SCANNER AND PRODUCING HIGH-CONTRAST PRINT IMAGES

CROSS-REFERENCE TO RELATED APPLICATIONS

The present application is a continuation of U.S. patent application Ser. No. 10/462,592, filed Jun. 17, 2003 now U.S. Pat. No. 6,954,261, which is hereby incorporated by reference herein in its entirety.

FIELD OF THE INVENTION

The present invention pertains to biometric imaging technology, and in particular, to live scanning of ridge print patterns.

BACKGROUND OF THE INVENTION

Biometric imaging systems include, but are not limited to, print ridge pattern or print imaging systems. These print imaging systems are often referred to in the relevant art as scanners or live scanners. Conventional live scanners use light to detect an image of a print. For example, an object having a print such as one or more fingers can be placed on a platen of a live scanner. An illumination source illuminates the underside of the platen. An image representative of the ridge pattern of the print is detected by an image sensor such as, for example, a solid-state camera.

Increasing demands are placed on the quality of a print image detected by live scanners. Live scanners are desired that can capture print images having a high-contrast and a high-resolution. One standard for live scanners promulgated by the Federal Bureau of Investigation (FBI) is the Integrated Automated Fingerprint Identification System (IAFIS) Image Quality Specifications (IQS) (Appendix F). To gain certification under Appendix F, a live scanner among other things must be able to capture an image at a resolution of 500 dots per inch (dpi) or greater and have generally uniform gray shading across a platen scanning area.

As illustrated by FIGS. 1A and 1B, conventional live scanners have illumination systems that directly illuminate the underside of a platen. As described below, this direct illumination of the underside of the platen has drawbacks.

FIG. 1A illustrates a first conventional live scanner 100 having an optical axis (OA) 101. Live scanner 100 includes an illumination source 102, an illumination optic system 104, a prism 106, a camera optical system 108, and a camera 110. As shown in the cross-sectional view of FIG. 1A, prism 106 includes three surfaces 120, 122 and 124. Surface 120 is the platen (platen 120). As described below, rays of light emitted from illumination source 102 directly illuminate platen 120.

In operation, an object having a print ridge pattern such as, for example, finger 112 is placed on platen 120 of live scanner 100 for imaging. Illumination source 102 of live scanner 100 emits rays of light. These rays of light are gathered by illumination optic system 104 and directed toward surface 122 of prism 106.

Rays of light emitted by illumination source 102 enter prism 106 at surface 122 and travel internally through prism 102 until they hit platen 120. Generally speaking, the rays of light hitting platen 120 are in total internal reflection (TIR). Incident rays of light hitting platen 120 will typically undergo TIR off platen 120 if they hit platen 120 at an angle greater than the critical angle. The critical angle is measured between an incident ray of light and a normal line to platen 120. TIR is broken, however, where a ridge 114 of finger 112 touches platen 120. TIR is not broken by a valley 116 of finger 112.

Rays of light hitting portions of platen 120 corresponding to valleys 114 of finger 112 are totally internally reflected toward surface 124 of prism 106. These totally internally reflected rays of light exit prism 106 at surface 124. Camera optics system 108 collects the rays of light exiting prism 106 at surface 124 and focuses them on an imaging portion of camera 110. Camera 110 forms an image of the print ridge pattern of finger 112 using the totally internally reflected rays of light.

In the image formed by camera 110 of live scanner 100, dark lines correspond to ridges 114 of finger 112 while light lines correspond to valleys 116 of finger 112. As will be understood by persons skilled in the relevant arts, in order to obtain a high-contrast print image using live scanner 100, it is necessary to achieve a flat, uniform illumination of the scanning area of platen 120. This is not a simple task. To accomplish this task, a complex illumination system is often used, which can make live scanner 100 cost prohibitive.

FIG. 1B illustrates a second conventional live scanner 150. Live scanner 150 includes an illumination source 102, a prism 152, a camera optic system 108, and a camera 110. As shown in the cross-sectional view of FIG. 1B, prism 152 includes four surfaces 154, 156, 158, and 160. Surface 154 is the platen (platen 154). Typically, a black coating of paint 170 is applied to surface 158. As described below, rays of light emitted from illumination source 102 directly illuminate the underside of platen 154.

As illustrated in FIG. 1B, in operation, an object having a print ridge pattern such as, for example, finger 112 is placed on platen 154 of live scanner 150 for imaging. Illumination source 102 of live scanner 150 emits rays of light that enter prism 152 through surface 156. These rays of light directly illuminate the underside of platen 154. A portion of these direct rays of light are diffused and scattered by print ridges 114 of finger 112. These diffused and scattered rays of light are used to form a print image. Any direct rays of light from illumination source 102 that do not hit a ridge 114 of finger 112 exit prism 150 at platen 154 because these rays of light are not in TIR. Rays of light exiting prism 150 at platen 154 (e.g., because of the presence of a valley 116 of finger 112) cannot be used to form the print image.

A portion of the rays of light from illumination source 102 that are diffused and scattered by ridges 114 of finger 112 travel directly to camera optics system 108 and camera 110 where they are used to form a print image. Where the fingerprint valleys 116 occur, camera 110 and camera optical system 108 image black painted surface 158 and appear dark with respect to the fingerprint ridges 114. This is because TIR is not broken by a valley 116 of finger 112.

In the print image formed by live scanner 150, light lines correspond to print ridges while dark lines correspond to print valleys. As will be understood by persons skilled in the relevant arts, the reflected rays of light that help form the print image have a lower intensity than the rays of light that travel directly from ridges 114 toward camera optics system 108 and camera 110 without being reflected. This difference in intensity provides image contrast, i.e., a contrast between print ridges and print valleys. The direct rays of light have a higher intensity that the reflected rays of light and thus form the light lines that correspond to print ridges. The lower intensity reflected rays of light form dark lines that correspond to print valleys.

Because live scanner 150 relies on print ridges to diffuse and scatter light used for print image formation, live scanner 150 cannot be used to form high-contrast print images for certain individuals having dark print ridges (i.e., print ridges that contain more than some threshold amount of the skin pigment melanin, particularly the form know as eumelanin). Dark print ridges absorb more light than lighter print ridges. Thus, as a result, dark print ridges diffuse and scatter less light than lighter print ridges, resulting in the formation of lower contrast images.

What is needed is a live scanner that does not have the shortcomings of a conventional live scanner. In particular, what is needed is a live scanner without a complex illumination system that can produce a high-contrast print image for any individual.

BRIEF SUMMARY OF THE INVENTION

The present invention provides systems and methods for illuminating a platen in a live scanner and producing high-contrast print images. In embodiments of the present invention, light from an illumination source is injected into a prism of a print scanner through an illumination injection surface. The illumination injection surface is a surface that is not directly imaged by an optical system and an image sensor of the print scanner. This injected light travels within the prism and hits a reflective surface of the prism at an angle that is less than the critical angle of the reflective surface. When this light hits the reflective surface, it is scattered and becomes diffused. Some rays of this diffused light remain in total internal reflection (TIR) within the prism, are reflected from the underside of the platen surface of the prism, and travel along an optical axis of an optical system for detection at an image sensor.

Various types of surfaces can be used as an illumination injection surface in accordance with the present invention. In an embodiment, the illumination injection surface is a flat surface connecting the platen to an image viewing surface. The angle formed between the platen and the illumination injection surface is at least ninety degrees. An optional lens may be placed between the illumination injection surface and an illumination source used to inject light into the prism. In another embodiment, the illumination injection surface is a curved surface connecting the platen to the image viewing surface. In a further embodiment, the illumination injection surface is a portion of the platen.

In embodiments of the present invention, the illumination reflection surface of the prism is coated with a reflective coating that efficiently diffuses incident light. In one embodiment, this reflective coating is paint such as, for example, reflective white paint. In another embodiment, the illumination reflection surface of the prism is ground, roughened and/or frosted prior to having the reflective coating applied.

It is a feature of the present invention that many different types of illumination sources and cameras can be used. These different illumination sources and cameras can be used alone or in combination with optical lenses.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 7 is a flowchart illustrating the steps of a method for producing a ridge pattern image with a live scanner according to the present invention.

Figure 1A:
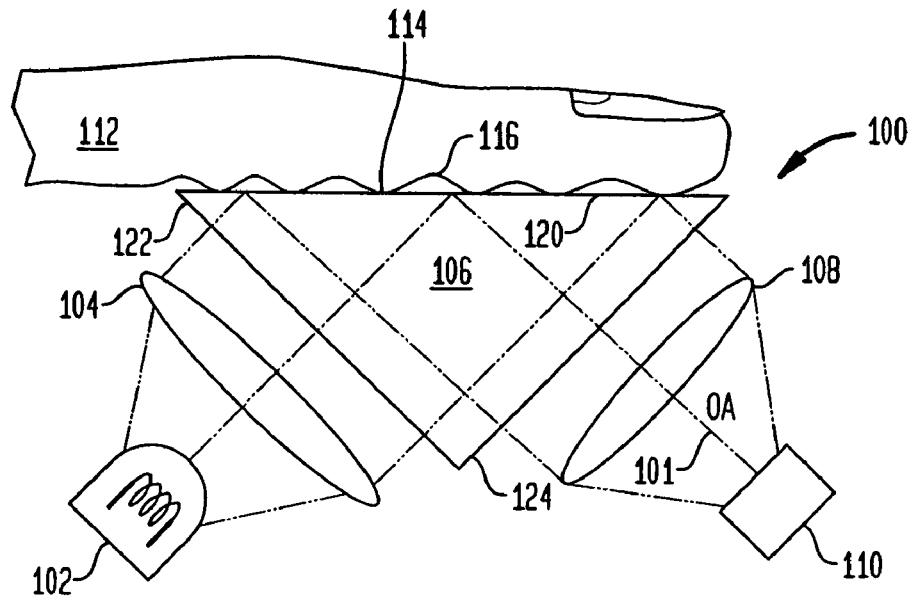
FIG. 1A is a cross-sectional schematic diagram of an optical system of a first conventional live scanner.
Figure 1B:
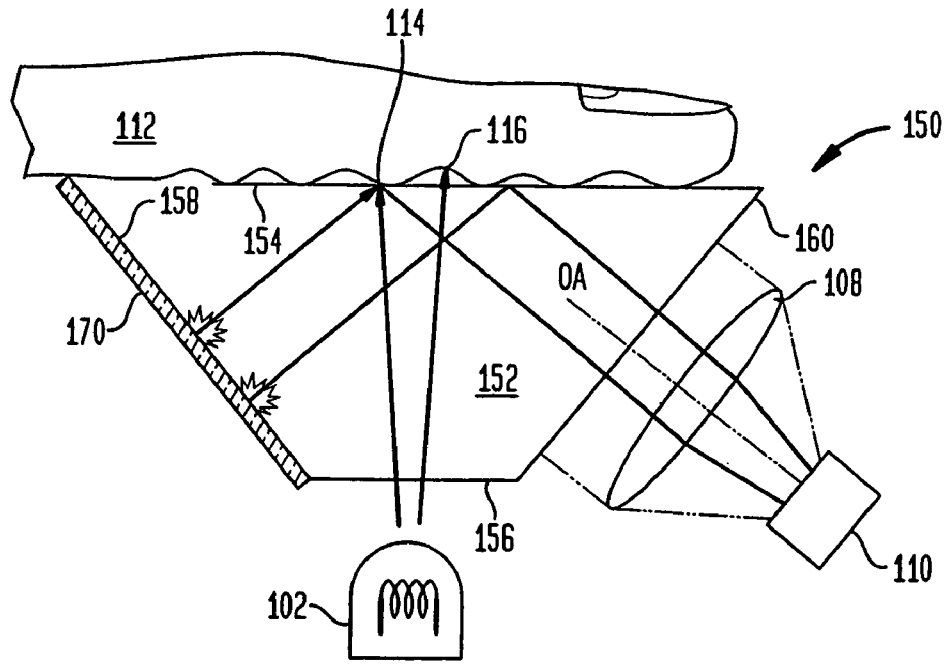
FIG. 1B is a cross-sectional schematic diagram of an optical system of a second conventional live scanner.

The present invention will now be described with reference to the accompanying drawings. In the drawings, like reference numbers indicate identical or functionally similar elements. Additionally, the leftmost digit of a reference number identifies the drawing in which the reference number first appears.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

1. Overview

The present invention provides among other things a simplified means for achieving uniform, diffuse light illumination of a platen in a live scanner. Live scanners incorporating the present invention are able to meet the increasing demands for capturing high-resolution and high-contrast print images.

2. Terminology

To more clearly delineate the present invention, an effort is made throughout the specification to adhere to the following term definitions consistently.

The term "finger" refers to any digit on a hand including, but not limited to, a thumb, an index finger, a middle finger, a ring finger, or a pinky finger.

The term "live scan" refers to a scan of any print ridge pattern made by a print scanner. A live scan can include, but is not limited to, a scan of a finger, a finger roll, a flat finger, a slap print of four fingers, a thumb print, a palm print, or a combination of fingers, such as, sets of fingers and/or thumbs from one or more hands or one or more palms disposed on a platen.

In a live scan, for example, one or more fingers or palms from either a left hand or a right hand or both hands are placed on a platen of a scanner. Different types of print images are detected depending upon a particular application. A flat print consists of a fingerprint image of a digit (finger or thumb) pressed flat against the platen. A roll print consists of an image of a digit (finger or thumb) made while the digit (finger or thumb) is rolled from one side of the digit to another side of the digit over the surface of the platen. A slap print consists of an image of four flat fingers pressed flat against the platen. A palm print involves pressing all or part of a palm upon the platen. A platen can be movable or stationary depending upon the particular type of scanner and the type of print being captured by the scanner.

The terms "biometric imaging system," "print scanner," "scanner," "live scanner," "live print scanner," and "fingerprint scanner" are used interchangeably, and refer to any type of scanner which can obtain an image of a print ridge pattern in a live scan. The obtained images can be combined in any format including, but not limited to, an FBI, state, or international tenprint format.

The term "platen" refers to a component that includes an imaging surface upon which at least one finger, for example, is placed during a live scan. A platen can include, but is not limited to, a surface of an optical prism or a surface of a silicone layer or other element disposed in optical contact with a surface of an optical prism.

3. System Embodiments of the Present Invention

Figure 2A:
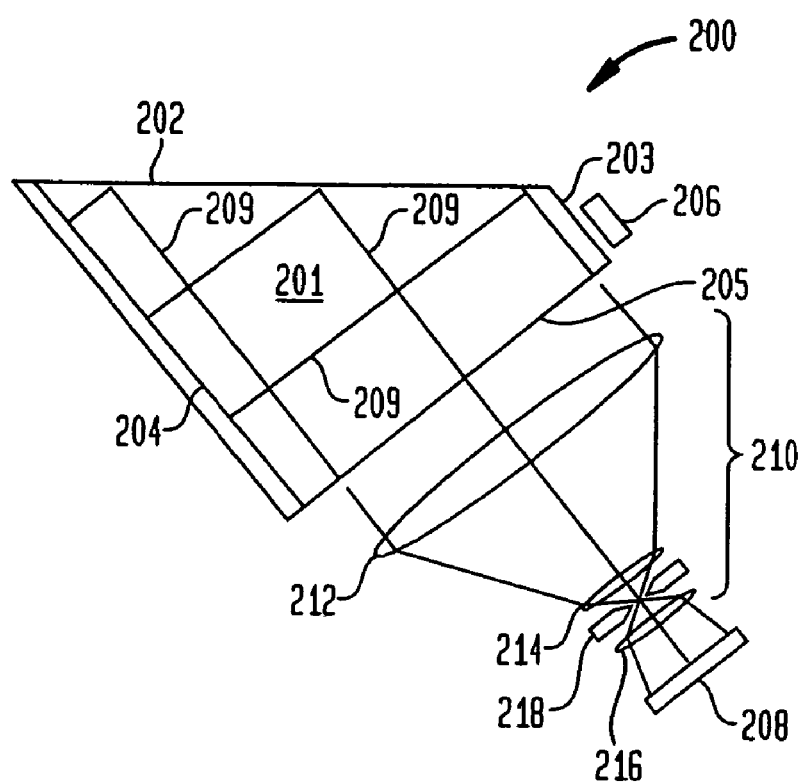
FIG. 2A is a cross-sectional schematic diagram of an optical system of a live scanner according to the present invention.

FIG. 2A is a cross-sectional schematic diagram of a live scanner 200 according to the present invention. Live scanner 200 includes a prism 201, an illumination source 206, an image sensor 208, and an optical system 210. Surface 202 of prism 201 is the platen surface or platen. Surface 204 of prism 201 is a highly reflective surface referred to herein as an illumination reflection surface. In a preferred embodiment, surface 204 is ground or frosted to reduce specular reflection and coated with highly reflective white paint to produce efficient diffused reflection. The invention is not limited, however, to using only white paint. Colors other than white can be used and may be preferable to white depending on the wavelengths of light emitted by the illumination source 206 that is used. In one embodiment, the reflective surface 204 or reflective coating applied to surface 204 is a holographic film that concentrates the reflected light in such a way that it enhances the amount of light hitting the underside of the platen at angles greater than the total internal reflection critical angle, thereby improving illumination efficiency and image contrast.

As shown in FIG. 2A, in an embodiment of live scanner 200, optical system 210 includes three lenses 212, 214, and 216, and an aperture 218 to focus light from prism 201 onto image sensor 208. Illumination source 206 can be any illumination source such as, for example, an array of light-emitting diodes (LEDs). Image sensor 208 can be any type of image sensor such as, for example, a solid state camera.

Live scanner 200 operates as follows. Light from illumination source 206 is injected into prism 201 through an illumination injection surface 203 that is not directly imaged by optical system 210 and image sensor 208. This light travels internally through prism 201 and hits the highly reflective surface or illumination reflection surface 204 of prism 201. When this light hits surface 204, it is scattered and becomes diffused. Some of this diffused light remains in total internal reflection (TIR) and is reflected off the underside of platen surface 201. The TIR reflected light exits prism 201 at an image viewing surface 205 and is imaged by optical system 210 and image sensor 208. Optical rays 209 illustrate the imaging field of optical system 210 and image sensor 208.

The operation of live scanner 200 is further described below with reference to FIGS. 3–5.

Figure 2B:
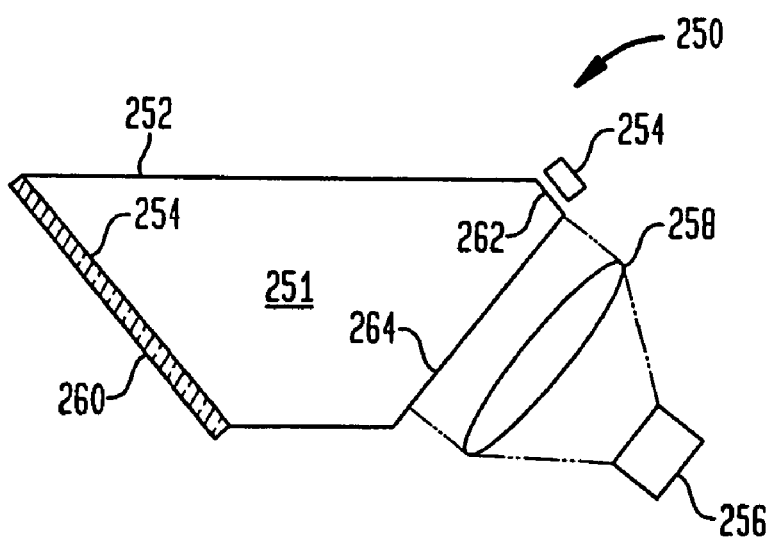
FIG. 2B is a cross-sectional schematic diagram of a second optical system of a live scanner according to the present invention.

FIG. 2B is a cross-sectional schematic diagram of a live scanner 250 according to the present invention. Live scanner 250 includes a prism 251, an illumination source 254, a camera 256, and an optical system 258. Surface 252 of prism 251 is the platen surface or platen. Surface 254 of prism 251 is a highly reflective surface or illumination reflection surface. In a preferred embodiment, surface 254 is ground or frosted to reduce specular reflection and coated with highly reflective white paint 260 to produce efficient diffused reflection. As with live scanner 200, live scanner 250 is not limited to using only white paint. Colors other than white can be used and may be preferable to white depending on the wavelengths of light emitted by the illumination source 254 that is used. Surface 262 of prism 251 is the illumination injection surface. Surface 264 of prism 251 is the image viewing surface. Live scanner 250 operates in a manner similar to live scanner 200.

Figure 3A:
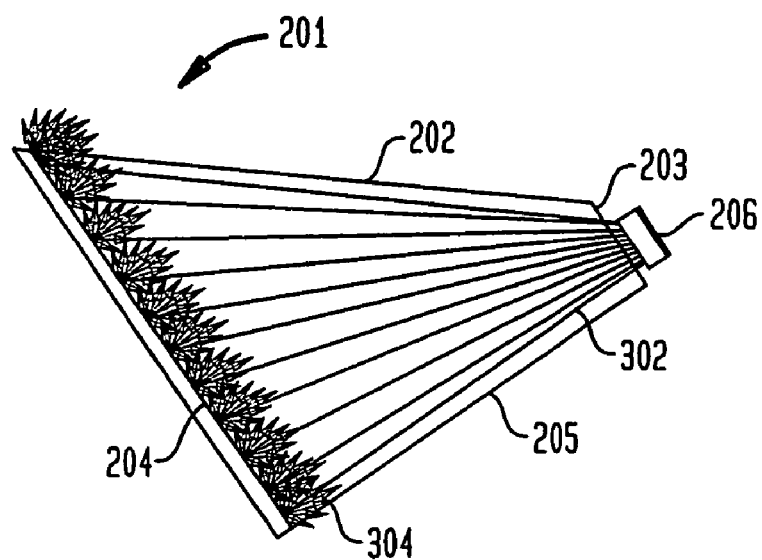
FIG. 3A is a cross-sectional schematic diagram of the illumination source and the prism of FIG. 2A.

FIG. 3A is a cross-sectional schematic diagram of illumination source 206 and prism 201 of FIG. 2A. As shown in FIG. 3A, light rays 302 enter prism 201 from illumination source 206 at illumination injection surface 203. For purposes of simplicity and clarity, not all of the rays of light are shown in FIG. 3A. The light rays 302 travel internally through prism 201 and hit surface 204 of prism 201. Surface 204 scatters and diffuses light rays 302 to produce diffused light 304.

As shown in FIG. 3A, illumination injection surface 203 connects platen surface 202 to image viewing surface 205. The internal angle of prism 201 formed between platen surface 202 and illumination injection surface 203 is greater than ninety degrees. Using an internal angle of greater than ninety degrees between platen surface 202 and illumination injection surface 203 limits the number of light rays 302 that enter illumination injection surface 203 from illumination source 206 and hit the underside of platen surface 202 before being diffused by illumination reflection surface 204. In certain embodiments, limiting the number of light rays 302 from illumination source 206 that hit the underside of platen surface 202 before being diffused by illumination reflection surface 204 can improve the contrast of a print image formed by image sensor 208.

Figure 3B:
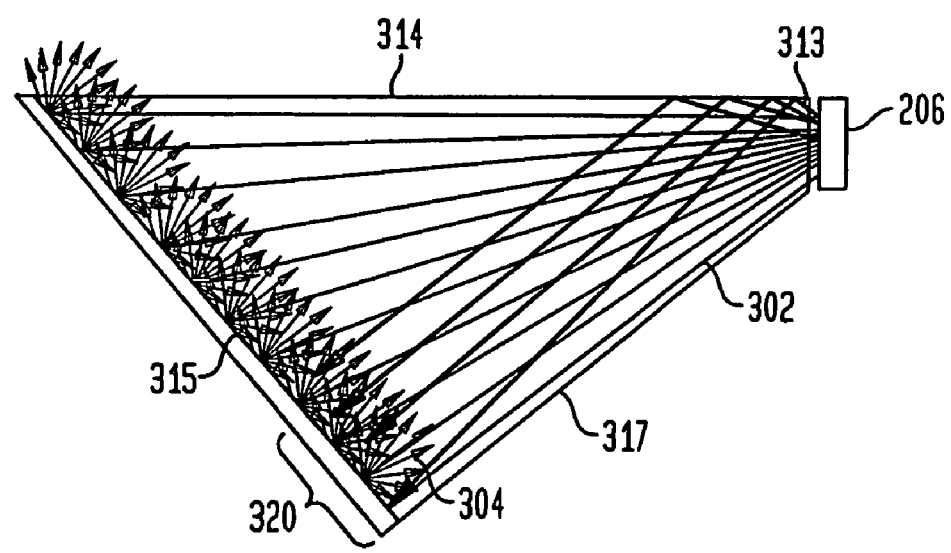
FIG. 3B is a cross-sectional schematic diagram of another example embodiment of an illumination source and a prism according to the present invention.

FIG. 3B is a cross-sectional schematic diagram of illumination source 206 and a prism 310. As shown in FIG. 3B, light rays 302 enter prism 310 from illumination source 206 at illumination injection surface 313. For purposes of simplicity and clarity, not all the rays of light are shown in FIG. 3B. The light rays 302 travel internally through prism 310 and hit surface 315 of prism 310. Surface 315 scatters and diffuses light rays 302 to produce diffused light 304.

As shown in FIG. 3B, illumination injection surface 313 connects platen surface 314 to image viewing surface 317.

Illumination injection surface 313 is perpendicular to platen surface 314. In FIG. 3B, rays of light emitted by illumination source 206 are shown entering prism 310 and traveling internally through prism 313. A number of these light rays 302 travel directly across prism 310 until they reach surface 315. Some of these light rays 302, however, are reflected off the underside of platen surface 314 and are redirected towards, for example, area 320 of surface 315. These redirected light rays 302 are beneficial certain embodiments and are used to redistribute the rays of light from illumination source 206 in such a way as to minimize differences in illumination intensity across surface 315.

Figure 4:
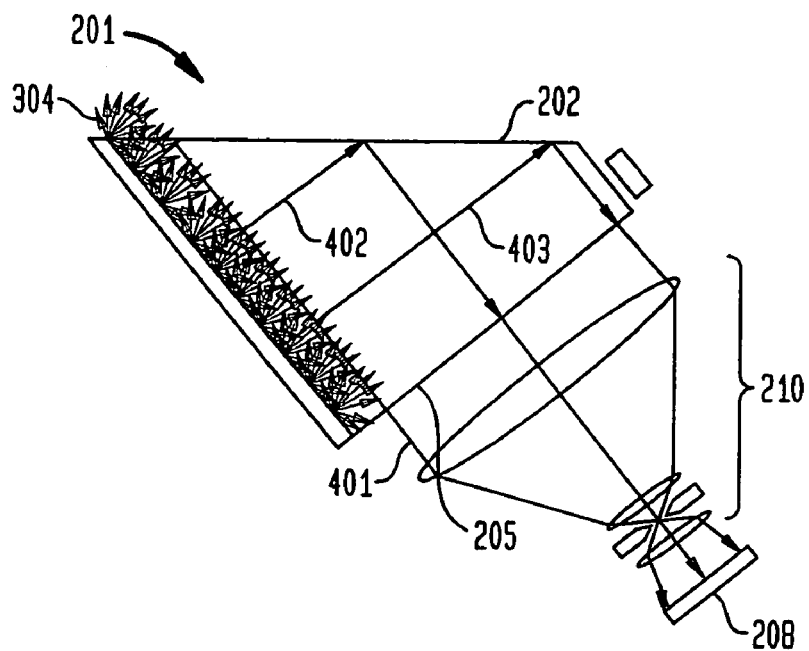
FIG. 4 is a cross-sectional schematic diagram illustrating the total internal reflection (TIR) operation of the live scanner of FIG. 2A.

FIG. 4 is a cross-sectional schematic diagram illustrating the TIR operation of live scanner 200 of FIG. 2A. As shown in FIG. 4, some of the diffused light 304 formed by surface 204 hits platen 202 and remains in TIR. This diffused light is reflected off the underside of platen surface 202. Rays of light totally internally reflected off platen surface 202 exit prism 201 at image viewing surface 205 and are imaged by optical system 210 and image sensor 208. Diffused light rays 401, 402, and 403 illustrate the imaging field of optical system 210 and image sensor 208.

Figure 5:
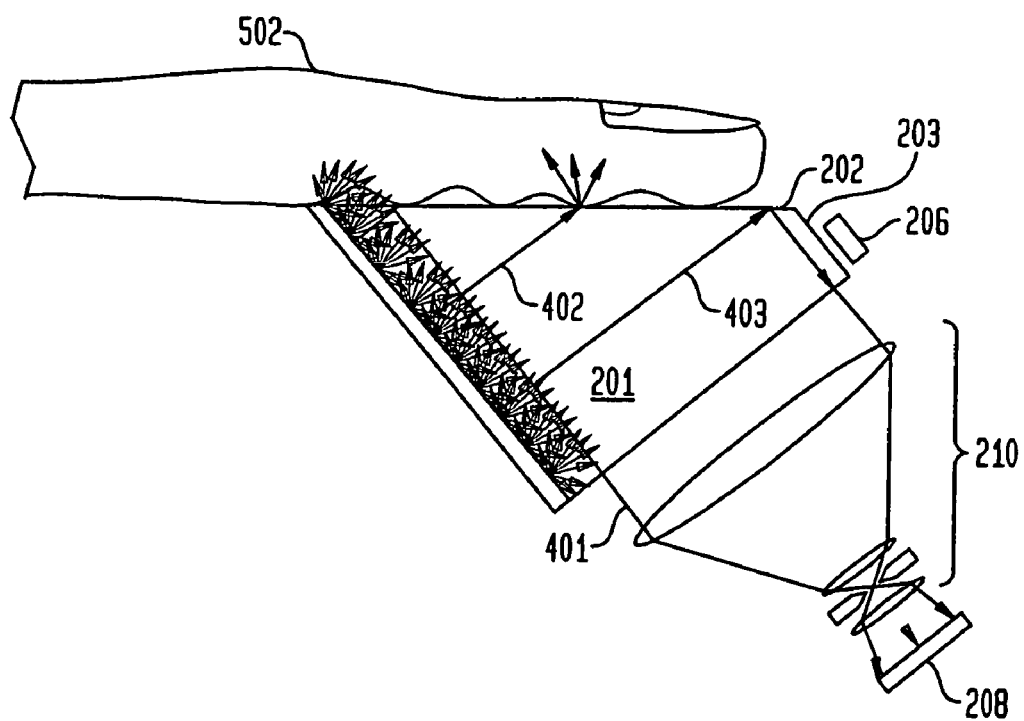
FIG. 5 is a cross-sectional schematic diagram illustrating how the presence of a finger changes the TIR operation of the live scanner of FIG. 2A.

FIG. 5 is a cross-sectional schematic diagram illustrating how the presence of a finger 502 changes the TIR operation of live scanner 200 of FIG. 2A. When finger 502 is placed on platen surface 202, the fingerprint ridges of finger 502 break the TIR of platen surface 202. The diffused light escapes prism 201 at the places where the TIR at platen surface 202 is broken. As shown in FIG. 5, diffused light rays 401 and 403 are imaged by optical system 210 and image sensor 208 despite the presence of finger 502. However, diffused light ray 402 hits a portion of platen surface 202 where the TIR of platen surface 202 is broken by the presence of a fingerprint ridge. Thus, light ray 402 escapes prism 201 at platen surface 202 and is not collected by optical system 210. As will be understood by persons skilled in the relevant arts given the description herein, in the fingerprint ridge pattern image formed by image sensor 208, the fingerprint ridges of finger 502 appear dark and the fingerprint valleys of finger 502 appear light.

Figure 6:
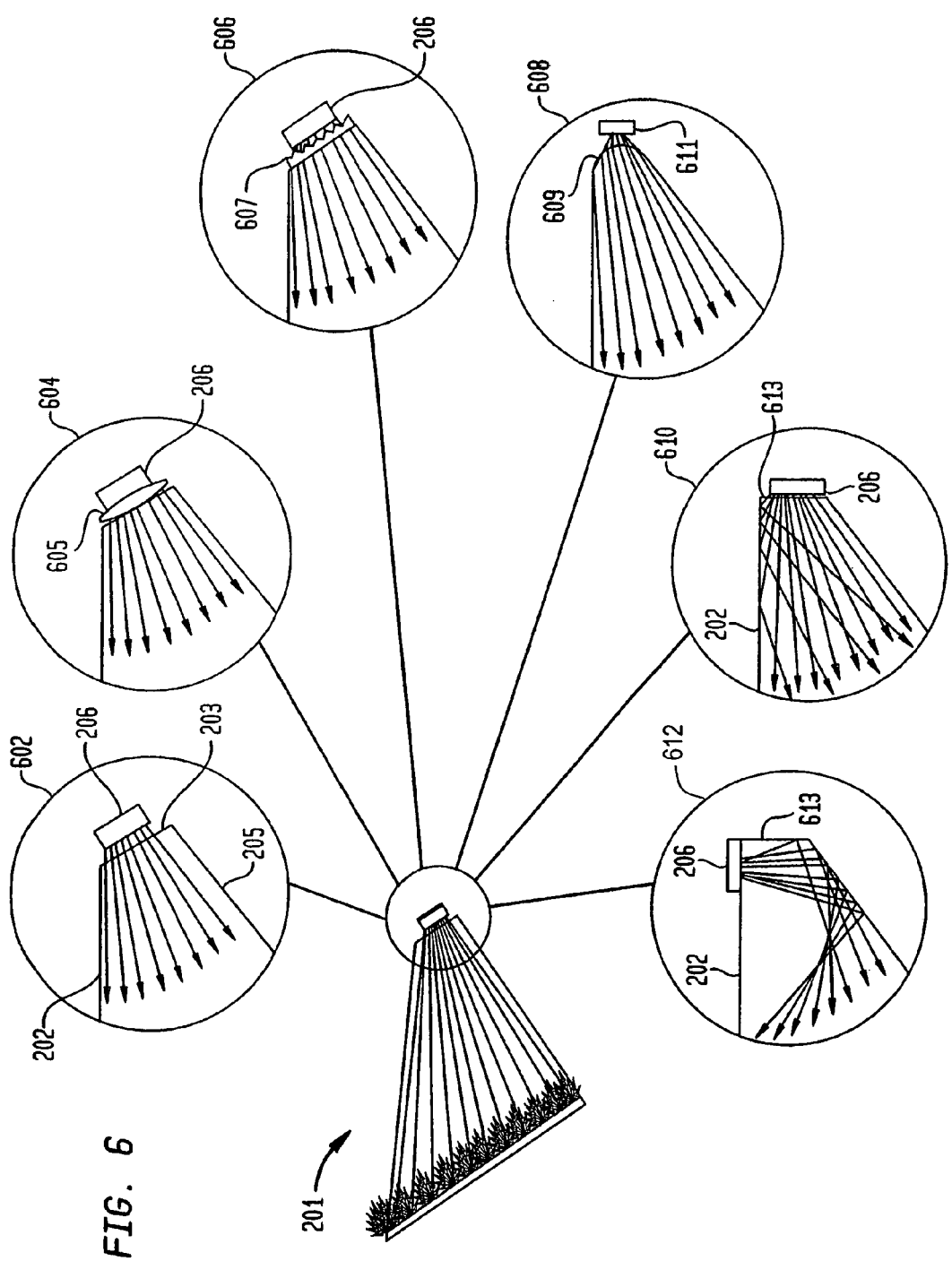
FIG. 6 is a cross-sectional schematic diagram illustrating various illumination injection surfaces according to the present invention.

FIG. 6 is a cross-sectional schematic diagram illustrating various illumination injection surfaces according to the present invention. As described herein, these various embodiments allow a print scanner according to the present invention to achieve a flat, diffused illumination of the underside of a platen surface of a prism such as, for example, prism 201. Each of the embodiments illustrated in FIG. 6 operates in a manner similar to that described herein for live scanner 200.

Embodiment 602 in FIG. 6 is the embodiment of the present invention described above with regard to FIG. 3A. Embodiment 602 comprises prism 201 and illumination source 206. As shown in FIG. 6, illumination injection surface 203 is a flat surface that connects platen surface 202 and image viewing surface 205. The angle formed between platen surface 202 and image viewing surface 205 is greater than ninety degrees. In embodiment 602, no lense is used between illumination source 206 and illumination injection surface 203.

Embodiment 604 is similar to embodiment 602 except that it includes a lens 605 positioned between prism 201 and illumination source 206. Lense 605 is a conventional optical lens used, for example, to shape and/or to filter the light emitted from illumination source 206. Shaping and/or filtering the light emitted by illumination source 206 before it is injected into prism 201 is beneficial for reasons that will be known to persons skilled in the relevant arts given the description herein.

Embodiment 606 is also similar to embodiment 602 except that it includes a lens 607 positioned between prism 201 and illumination source 206. Lense 607 is a diffusing lens that diffuses the light emitted from illumination source 206 before it is injected into prism 201. As would be known to persons skilled in the relevant arts, it is beneficial to use a diffusing lense with certain illumination sources.

Embodiment 608 illustrates prism 201 having a curved illumination injection surface 609. The curvature of illumination injection surface 609 bends incident light. When using prism 201 with curved injection illumination surface 609, it is possible, for example, to use a physically smaller illumination source 611 to inject light into prism 201. The shape of curved illumination injection surface 609 is illustrative and not intended to limit the present invention.

Embodiment 610 is the embodiment of the present invention described above with regard to FIG. 3B. Illumination injection surface 613 is flat and perpendicular to platen surface 202. As shown in FIG. 6, rays of light emitted by illumination source 206 enter prism 201 and travel internally through prism 201. Many of these rays of light travel directly across prism 201 until they reach the reflective surface (not shown). Some of these rays of light, however, are reflected off the underside of surface 202 and are redirected towards the reflective surface (not shown). These redirected rays of light are beneficial in certain embodiments and are used to redistribute the light from illumination source 206 in such a way as to minimize differences in illumination intensity across the reflective surface.

Embodiment 612 is similar to embodiment 610 except that illumination source 206 has been repositioned so that it injects light into prism 201 through an end portion of platen surface 202. Embodiment 612 illustrates an example of the present invention wherein a single surface of prism 201 serves as both the platen surface and the illumination injection surface. An advantage of embodiment 612 is that it is more compact than embodiment 610 since illumination source 206 is now adjacent to platen surface 202 rather than surface 613.

As will be understood by persons skilled in the relevant arts given the description herein, the embodiments shown in FIG. 6 are illustrative and not intended to limit the present invention.

4. Method Embodiment of the Invention

FIG. 7 illustrates a flowchart of the steps of a method 700 according to the present invention for producing a pattern image such as, for example, a ridge print pattern of a fingerprint, palm print, and/or footprint. As shown in FIG. 7, method 700 comprises five steps.

Method 700 will now be described with reference to a live scanner having a prism, an illumination source, an optical system, and an image sensor. This structure is intended to aid in the description of method 700, and it is not intended to limit the invention.

In step 702, light is injected into the prism of the live scanner. The light is preferably injected through an illumination injection surface of the prism that is not imaged by the image sensor of the live scanner. FIG. 6 illustrates various exemplary arrangements of an illumination source and a prism that can be used to inject light into a prism. Once injected, the injected light travels internally through the prism until it hits an illumination reflection surface of the prism.

In step 704, the injected light is diffused by the illumination reflection surface of the prism. Ideally, the illumination reflection surface of the prism should have a coating such as a reflective paint that efficiently diffuses incident light. The illumination reflection surface can also be ground, frosted, or otherwise conditioned prior to coating to reduce spectral reflections.

In step 706, a platen surface of the prism is illuminated with the diffused light reflected off the illumination reflection surface of the prism. At least some of the reflected, diffused light remains in TIR in the prism and is reflected off the underside of the platen surface of the prism. As noted above, the presence of a finger ridge or a palm ridge on the platen surface will break the TIR of the platen surface.

In step 708, light reflected off the platen surface of the prism is collected. The purpose of this collection step is to ensure that sufficient light from the platen surface, which is representative of a ridge pattern, is appropriately directed to an image sensor. This collection step is performed by the optical system of the live scanner.

In step 710, the light collected in step 708 is focused onto an imaging portion of an image sensor, where it can be used to form an image of a ridge print pattern present on the platen surface of the prism.

5. Conclusions

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A print scanner, comprising:
   a prism having an illumination surface, an illumination reflection surface, and a platen surface; and
   an illumination source,
   wherein the illumination source injects rays of light into the prism at the illumination injection surface of the prism, the rays of light traveling internally through the prism to hit the illumination reflection surface of the prism, the rays of light hitting the illumination reflection surface at an angle less than the critical angle of the illumination reflection surface, which reflects rays of light, the reflected rays of light traveling internally through the prism to illuminate the platen surface.

2. The print scanner of claim 1, further comprising a diffuser between the illumination source and the illumination injection surface.

3. The print scanner of claim 1, wherein the illumination injection surface of the prism is a same surface of the prism as the platen surface.

4. The print scanner of claim 3, wherein the illumination source is adjacent to the illumination injection surface.

5. The print scanner of claim 3, wherein the rays of light are reflected off at least one other surface of the prism before hitting the illumination reflection surface.

6. The print scanner of claim 1, wherein the illumination reflection surface is diffusive.

7. The print scanner of claim 1, wherein the illumination injection surface is flat.

8. The print scanner of claim 1, wherein the illumination injection surface is curved.

9. The print scanner of claim 1, further comprising:
   an optical system; and
   an image sensor,
   wherein the optical system focuses an image of the platen surface of the prism onto an imaging portion of the image sensor, the image composed primarily of rays of light totally internally reflected at the platen surface.

10. The print scanner of claim 1, further comprising a lens disposed between the illumination source and the illumination injection surface.

11. A method for producing a print pattern with a print scanner, wherein the print scanner includes a prism and an illumination source, the prism having an illumination injection surface, an illumination reflection surface, and a platen surface, the method comprising:
   (a) injecting rays of light into the prism through the illumination injection surface of the prism such that the injected rays of light travel through the prism to hit the illumination reflection surface, the rays of light hitting the illumination reflection surface at an angle that is less than the critical angle of the illumination reflection surface;
   (b) reflecting the injected rays of light with the illumination reflection surface of the prism; and
   (c) illuminating the platen surface with the reflected rays of light from the illumination reflection surface of the prism.

12. The method of claim 11, further comprising:
   (d) collecting rays of light totally internally reflected off the platen surface of the prism; and
   (e) focusing the collected rays of light onto an imaging portion of the image sensor.

13. The method of claim 11, wherein step (a) comprises injecting rays of light through a diffuser at the illumination injection surface.

14. The method of claim 11, wherein step (a) comprises injecting rays of light through the illumination injection surface where the illumination injection surface is a same surface of the prism as the platen surface.

15. The method of claim 14, further comprising between step (a) and step (b):
   reflecting the rays of light off at least one other surface of the prism.

* * * * *